O. HAUGE & W. A. ENGLAND.
APPARATUS FOR MAKING PASTRY SHELLS.
APPLICATION FILED JAN. 2, 1917.
1,256,226. Patented Feb. 12, 1918.
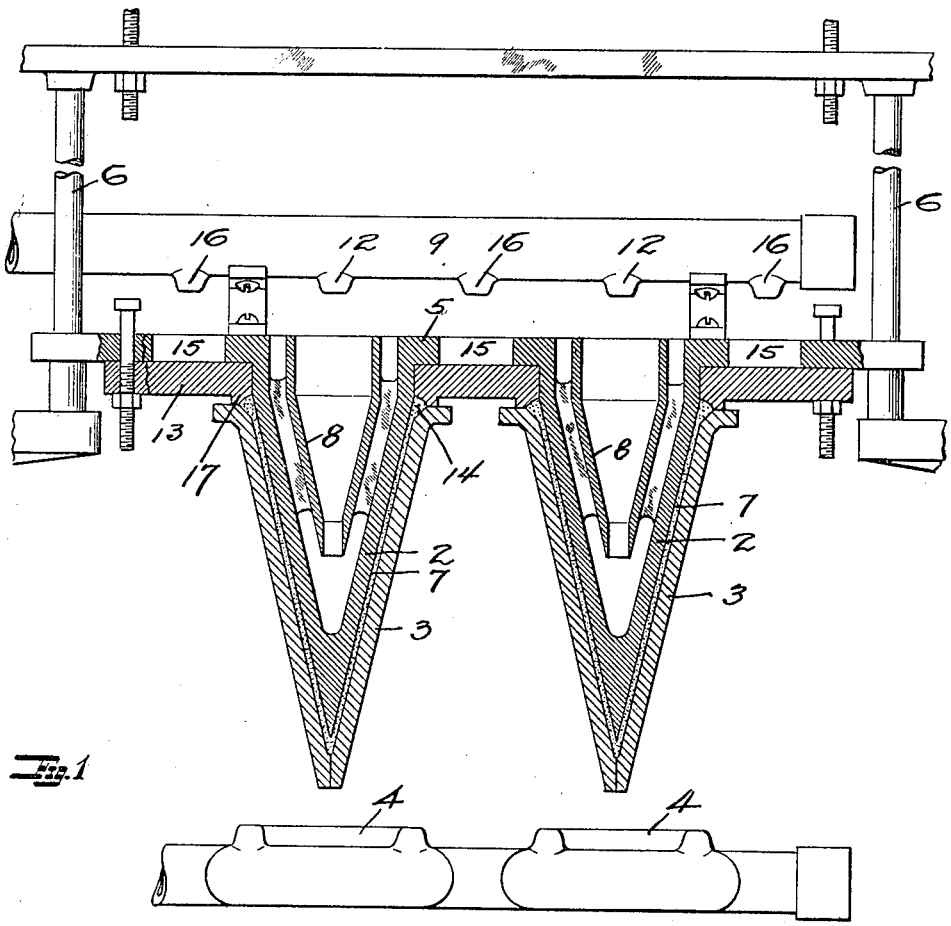
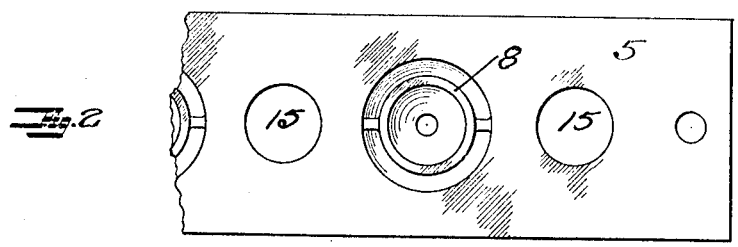
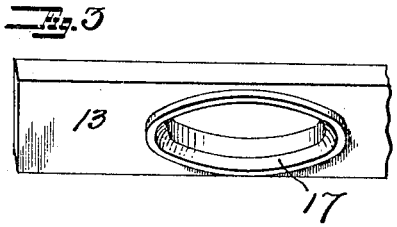
INVENTORS
OSCAR HAUGE
WM. A. ENGLAND
BY White & First
THEIR ATTORNEYS

UNITED STATES PATENT OFFICE.

OSCAR HAUGE AND WILLIAM A. ENGLAND, OF SAN FRANCISCO, CALIFORNIA.

APPARATUS FOR MAKING PASTRY SHELLS.

1,256,226.        Specification of Letters Patent.      Patented Feb. 12, 1918.

Application filed January 2, 1917. Serial No. 140,068.

*To all whom it may concern:*

Be it known that we, OSCAR HAUGE, a subject of the King of Norway, and WILLIAM A. ENGLAND, a citizen of the United States, both residents of the city and county of San Francisco, State of California, have invented a certain new and useful Apparatus for Making Pastry Shells, of which the following is a specification.

The invention relates to an apparatus for making pastry shells and particularly cone-shaped shells for the reception of ice cream and ices, usually known as ice cream cones.

An object of the invention is to provide means for producing an even baking of the shell at all parts.

Another object of the invention is to provide means for producing a reinforcing edge at the open end of the shell.

The invention possesses other advantageous features, some of which, with the foregoing, will be set forth at length in the following description where we shall outline in full that form of the invention which we have selected for illustration in the drawing accompanying and forming part of the present specification. In the drawings we have shown one particular form of apparatus, but it is to be understood that we do not limit ourselves to such form, since the invention as expressed in the claims may be embodied in a plurality of forms.

Referring to said drawings:

Figure 1 is an elevation, partly in section, of one embodiment of our invention.

Fig. 2 is a top view of the top plate.

Fig. 3 is a perspective view of a portion of the under side of the stripper plate.

The apparatus shown in the drawings is particularly adapted for the manufacture of ice cream cones and the parts thereof are shaped accordingly. The apparatus shown comprises only two baking molds, since that is sufficient to set forth our invention, but it is to be understood that in actual practice a greater number of molds are used. We have also omitted showing any means for introducing the batter into the mold or of separating the mold to facilitate the removal of the baked shell, since such features form no part of our present invention.

The apparatus of our invention comprises a plurality of hollow taps or cones 2 which are movable relatively to a plurality of conical molds 3, so that the taps may be inserted in or withdrawn from the molds and the molds are preferably split to facilitate withdrawal of the tap with the baked shell 7 thereon. The cavity in each mold is larger than the tap to the extent required to produce the shell of required thickness and the molds are externally heated, preferably by gas burners 4.

The taps 2 are secured to or formed integral with a plate 5, which, in the present construction, is mounted on guides 6, so that it may be reciprocated with respect to the mold. In order to properly bake the shell 7, it is advisable that heat be applied thereto from both the outside and the inside and difficulty has been experienced in the past in properly heating the tap. Several methods have been tried for heating the tap by directing a gas flame into the hollow tap, but this has proved unsuccessful due to the accumulation of gases of combustion in the tap which extinguish the flame before it enters the tap and due to the back draft from the tap which blows the flame away. In accordance with our invention, we provide a dividing wall within the tap which separates the incoming gas flame from the outgoing stream of flame or gas, thereby allowing the hot gases or flame to contact with all portions of the interior of the tap and heat the same equally.

Arranged in the tap 2 and spaced from the side walls thereof is a tube 8, preferably conical in shape and substantially parallel to the sides of the tap. Arranged above the tap and mounted on the plate 5 is a gas conduit 9 provided with a nozzle 12 for directing a flame into the tube 8 and the gas conduit is preferably mounted on the plate 5. The flame passes downward through the tube 8 and the flame or the gases of combustion pass upward through the annular passage between the tube and the tap. It is apparent that a circular flame may be directed down through the annular space and then pass up through the tube, instead of as first described.

A stripper plate 13 is provided for removing the baked shells from the taps after they have been withdrawn from the molds. It is desirable to form the shell with a thickened edge 14 and this is accomplished by beveling the upper inner edge of the mold and by providing the stripper plate with a recessed annular shoulder 17. When the shell is being baked the shoulder is in contact with the mold and the recess in the shoulder and the bevel in the mold form the mold in which the thickened edge is formed.

We have found that the presence of the stripper plate prevents the access of sufficient heat to the thickened portion to properly bake it and we have, therefore, provided means for heating the stripper plate. The plate 5 is provided with holes 15 exposing the stripper plate below and the gas conduit 9 is provided with nozzles 16 for directing flames through these holes to the stripper plate for the purpose of heating the stripper plate to a sufficient degree to insure the proper baking of the thick edge of the shell.

We claim:

1. In an apparatus for baking pastry shells, a hollow tap, a tube arranged within and spaced from the walls of said tap and a burner disposed to direct a flame into said tube.

2. In an apparatus for baking pastry shells, a hollow tap, a tube arranged in said tap dividing the interior thereof into an annular chamber and a circular chamber, and means disposed to direct a flame into one of said chambers.

3. In an apparatus for baking pastry shells, a hollow, conical tap, a conical tube arranged within and spaced from the walls of said tap and a burner disposed to direct a flame into said tube.

4. In an apparatus for baking pastry shells, a hollow tap, a stripper plate surrounding said tap and a burner arranged to internally heat said tap and to direct a flame against said stripper plate.

5. In an apparatus for baking pastry shells, a hollow tap, a stripper plate surrounding said tap, a burner mounted on said tap and provided with a nozzle for directing a flame into said tap and with a nozzle for directing a flame against said stripper plate.

6. In an apparatus for baking pastry shells, a mold, means for heating the mold, a hollow tap mounted to reciprocate into and out of the mold, means for internally heating said tap, a stripper plate surrounding said tap and means for heating said stripper plate.

In testimony whereof, we have hereunto set our hands at San Francisco, California, this 20th day of December, 1916.

OSCAR HAUGE.
WILLIAM A. ENGLAND.

In presence of—
H. G. PROST.

Copies of this patent may be obtained for five cents each, by addressing the "Commissioner of Patents, Washington, D. C."